UNITED STATES PATENT OFFICE.

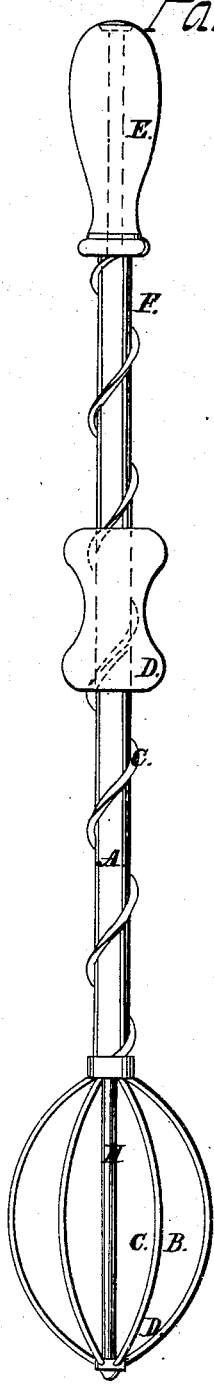

FREDERICK ASHLEY, OF NEW YORK, N. Y.

EGG-BEATER.

Specification of Letters Patent No. 28,047, dated May 1, 1860.

*To all whom it may concern:*

Be it known that I, FREDERICK ASHLEY, of the city, county, and State of New York, have invented a new and Improved Apparatus for Beating Eggs; and I do hereby declare that the following is a full and exact description of the same, reference being had to the accompanying drawing and to the letters of reference marked thereon, showing an elevation of the same.

My improvement relates to an apparatus for "beating" or breaking up and mixing together the yolks and whites of eggs for various purposes of domestic use; and consists of a shaft having a screw thread formed upon its upper end, with a nut fitted to work thereon, and a series of "beating" or breaking wires upon its lower end, the apparatus being operated by placing its lower end in the dish or vessel containing the eggs to be beaten, and revolving it by moving the nut up and down on the screw-threaded portion of the shaft, to give to the beating wires a rapid motion forward and backward to break up and mix the eggs.

A is a shaft, to the lower end of which is attached the series of "beating" or breaking wires B which are placed in and among the eggs to be beaten, and by the forward and backward movement of which, the eggs are beaten or broken up.

C is a screw thread worked or formed upon the shaft A, upon which is fitted and placed the nut D, by which the shaft is revolved back and forth by the up and down movement of the nut.

E is the handle, by which the shaft is held and steadied while it is operated, and which is retained upon the shaft by a collar which allows the shaft to be rotated without revolving the handle.

The operation of the apparatus is as follows: The lower end of the shaft A is placed in the dish or vessel containing the eggs to be beaten; the handle E is taken hold of by one hand of the operator, and the nut D by the other. The nut D is then moved up and down alternately, giving to the beating wires B a rapid motion forward and back, until the eggs are thoroughly "beat" or broken and mixed.

It is apparent that this apparatus is susceptible of being applied to other purposes of a similar character to the one described, such as churning cream or milk to produce butter; or agitating the materials to produce ice cream while they are being frozen. It can also be modified by making it an attached fixture to a churn or ice-cream freezer, and dividing its beaters into two sections which shall receive motion in a contrary direction to each other for the purpose of expediting the process of producing the butter or ice cream.

What I claim as my invention and desire to secure by Letters Patent is—

The combination of the beating or breaking wires B with the screw-threaded shaft A and nut D, as, and for the purpose set forth.

FREDK. ASHLEY.

Witnesses:
 IRA BUCKMAN, Jr.,
 FRANCIS S. LOW.